United States Patent Office 3,542,819
Patented Nov. 24, 1970

---

3,542,819
PROCESS FOR PREPARING 8-ISOESTRONE
David J. Marshall, Hampstead, Quebec, Canada, assignor to American Home Products Corporation, New York, N.Y., a corporation of Delaware
No Drawing. Filed June 11, 1968, Ser. No. 735,977
Int. Cl. C07c 169/10
U.S. Cl. 260—397.4                    7 Claims

---

ABSTRACT OF THE DISCLOSURE

There is disclosed herein a process for preparing 8-isoestrone, a powerful estrogen, by treatment of a 17-ketal derivative of equilenin or of equilin with potassium in liquid ammonia.

---

The present invention relates to a process for preparing 8-isoestrone, also called 8α-estrone by some authors, a powerful estrogen which is also useful as an intermediate in the preparation of 17α-ethylnyl-8-isoestradiol and 8-isoestradiol 3-methyl ether.

8-isoestrone and the corresponding 8-isoestradiol have been described by Serini and Logemann in Berichte vol. 71, p. 186 (1938) and have been shown to be powerful estrogens when tested in the rat by the standard Allen-Doisy test method.

17α-ethynyl-8-isoestradiol has been described by Rufer et al. in Ann. Chem. vol. 705, p. 211 (1967) where it is shown that the compound has high estrogenic and ovulation-inhibiting activities. 8-isoestradiol 3-methyl ether has been described by Buzby et al. in J. Med. Chem. vol. 9, p. 338 (1966), and has been found to posses a comparatively high degree of cholesterol-lowering activity coupled with a very low degree of estrogenic activity, an interesting combination of properties potentially valuable in the treatment of atherosclerosis.

It is an object of this invention to provide a useful process for the preparation of 8-isoestrone. In my copending U.S. patent application S.N. 653,009, filed July 13, 1967, now U.S. Pat. No. 3,470,159, I have described a process for preparing 3-hydroxyestra-1,3,5(10),7-tetraen-17-one (equilin) and certain derivatives thereof from 3-hydroxyestra - 1,3,5(10),6,8 - pentaen-17-one (equilenin) and the corresponding derivatives thereof, by reduction of the latter compounds in solution in liquid ammonia with lithium, sodium, potassium, or calcium metal at temperatures from —70° C. to —33° C. I have now found that when the above reaction is carried out with a 17-ketal derivative of 3-hydroxyestra-1,3,5(10),6,8-pentaen-17-one as starting material, and using potassium metal preferably at the boiling point of liquid ammonia (—33° C.) as the reducing agent, 8-isoestrone is obtained as the major product after removal of the protective ketal group by treatment with acid.

This formation of 8-isoestrone is indeed unexpected and surprising, because isolated double bonds are not usually reduced by metals in liquid ammonia. Moreover, if a rearrangement of the double bond to the conjugated 8,9-position had occurred, reduction of such a compound would be expected to yield estrone rather than 8-isoestrone. I believe therefore that the intermediate product of the above reaction is indeed 3-hydroxyestra-1,3,5(10), 7-tetraen-17-one (equilin) or one of its derivatives corresponding to the starting material, and this is borne out by the fact that I have succeeded in obtaining 8-isoestrone from equilin in high yield by treatment of a ketal of the latter with potassium metal in liquid ammonia at —33° C., followed by treatment with acid.

More specifically, I prefer to use as starting material equilenin or equilin ethylene ketal or dimethyl ketal, although other ketals, such as, for example, the propylene ketal or the di(lower alkyl)ketals containing from 2-4 carbon atoms in the lower alkyl groups are equally useful. A solution of one of those compounds in an ether-type solvent, for example tetrahydrofuran, or diethyl ether is added dropwise to a solution of potassium in liquid ammonia at or near its boiling point. Alternatively, the solid steroid ketal is added directly to the solution of potassium in ammonia. The mixture is preferably kept under reflux for several hours. Excess potassium is destroyed by addition of a proton source such as, for example, ethanol or ammonia chloride, the ammonia is allowed to evaporate, and the product is extracted with a water-immiscible solvent such as ether or ethyl acetate. The crude product is treated with an acid such as, for example hydrochloric acid or toluenesulfonic acid for a period of time sufficient to remove the protective ketal group, preferably about one hour. Evaporation of the solvent, dilution with water, extraction with a water-immiscible solvent such as, for example, ethyl acetate, and chromatography of the extract followed by crystallization yields 8-isoestrone.

The following examples and formulae, in which R and R¹ represent lower alkyl groups or R and R¹ together represent an alkylene group, will illustrate this invention.

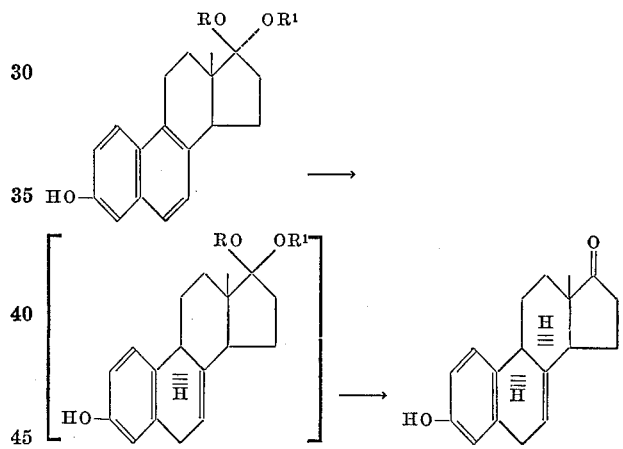

EXAMPLE 1

Equilenin ethylene ketal

A mixture of 18 g. of equilenin, 1.0 g. of p-toluenesulfonic acid and 100 ml. of ethylene glycol in 600 ml. of benzene is stirred and refluxed for 5.5 hours through a water separator. The lower layer is separated from the warm mixture, and the benzene solution is diluted with ether and washed with saturated sodium bicarbonate solution, dried, and concentrated. Crystallization from methylene chloride-hexane yields equilenin ethylene ketal, M.P. 162–165°.

In the same manner, by using propylene glycol instead of ethylene glycol, equilenin propylene ketal is obtained.

EXAMPLE 2

Equilin dimethyl ketal

To a stirred suspension of 5.00 g. of equilin in 25 ml. of methanol and 25 ml. of trimethyl orthoformate is added 2.5 ml. of a solution of 0.2 ml. of concentrated sulfuric acid in 4 ml. of trimethyl orthoformate. The steroid rapidly dissolves and the product precipitates slowly. After 2 hours, the mixture is neutralized with a few drops of pyridine, cooled, and filtered to yield equilin dimethyl ketal, M.P. 199–200°. The infrared spectrum shows the absence of carbonyl and ether bands are present at 1105–1110 cm.$^{-1}$.

In the same manner, by using equivalent amounts of ethanol instead of methanol and triethyl orthoformate instead of trimethyl orthoformate, equilin diethyl ketal is obtained.

EXAMPLE 3

8-isoestrone (A) To a refluxing solution of 10.2 g. of potassium in 250 ml. of distilled ammonia is added dropwise a solution of 1.00 g. of equilenin ethylene ketal in 20 ml. of tetrahydrofuran. After stirring for 3 hours, ethanol is added dropwise until the blue color disappears, the ammonia is allowed to evaporate, and the product is extracted with ether. A solution in 10 ml. of acetone of the crude product obtained by evaporation of the dried ether extract is treated with 1 ml. of 10% hydrochloric acid and kept at 40–50° for one hour. The solution is concentrated under reduced pressure, diluted with water, and extracted with ethyl acetate. The product so obtained is chromatographed on 40 g. of deactivated silica gel. The material eluted with benzene containing 5% ether is crystallized from methanol to yield 8-isoestrone, M.P. 246–247° (dec.), $\lambda_{max}$ 278.5 m$\mu$ ($\epsilon$ 2340).

(B) To a solution of 20.4 g. of potassium in 300 ml. of refluxing ammonia is added dropwise a solution of 2.00 g. of equilin dimethyl ketal in 20 ml. of tetrahydrofuran. After stirring for 3 hours, ammonium chloride is added in small portions until the solution is decolorized, the ammonia is allowed to evaporate, and the product is extracted with ether. The ether extract is washed with water, dried, and concentrated to dryness leaving a pale yellow solid. A solution of this material in 20 ml. of acetone is treated with 0.5 ml. of 10% hydrochloric acid and kept for one hour at room temperature. Dilution with 25 ml. of water and filtration yields 1.7 g. of 8α-estrone, M.P. 242–244° (dec.). Recrystallization from methanol and then from ethyl acetate gives the title compound with M.P. 247–249°, $[d]_D$+101° (dioxane), identical with the compound obtained as described above.

In the same manner, by using diethyl ether as the solvent, or using no solvent at all for the starting material, by using the propylene or diethyl ketals instead of the ethylene or dimethyl ketals of equilenin or of equilin, and by using toluenesulfonic acid instead of hydrochloric acid, 8-isoestrone is also obtained.

I claim:

1. The process of preparing 8-isoestrone which comprises treating a 17-ketal derivative of a steroid selected from the group which consists of equilenin and equilin with potassium in liquid ammonia; eliminating excess potassium from the reaction mixture; and treating the crude product thus obtained with an acid, thereby removing the ketal group and securing 8-isoestrone.

2. The process as defined in claim 1 wherein the 17-ketal derivative and potassium are brought together in liquid ammonia at the boiling point thereof.

3. The process of preparing 8-isoestrone which comprises treating a compound selected from the group which consists of equilenin ethylene ketal and equilin dimethyl ketal with potassium in liquid ammonia; eliminating excess potassium from the reaction mixture; extracting said reaction mixture with a water-immiscible solvent, thereby recovering crude product; and treating said crude product with an acid, thereby removing the ketal group and securing 8-isoestrone.

4. The process as defined in claim 3 wherein the compound selected from the group which consists of equilenin ethylene ketal and equilin dimethyl ketal and the metallic potassium are brought together in refluxing ammonia at the boiling point thereof.

5. The process as defined in claim 3 wherein a proton source selected from the group which consists of ethanol and ammonium chloride is added to the reaction mixture to eliminate excess potassium therefrom.

6. The process as defined in claim 5 wherein excess ammonia is allowed to evaporate off before addition of the water-immiscible solvent to the reaction mixture.

7. The process as defined in claim 6 wherein the water-immiscible solvent used to extract the crude reaction product is selected from the group which consists of ether and ethyl acetate.

References Cited

Djerassi—Steroid Reactions—1963, pp. 300 and 306.

HENRY A. FRENCH, Primary Examiner

U.S. Cl. X.R.

260—239.55, 397.45, 397.5, 999